(12) United States Patent
Ulrich et al.

(10) Patent No.: US 6,297,818 B1
(45) Date of Patent: Oct. 2, 2001

(54) GRAPHICAL USER INTERFACE HAVING SOUND EFFECTS FOR OPERATING CONTROL ELEMENTS AND DRAGGING OBJECTS

(75) Inventors: Robert Ulrich, Mountain View; Arlo Rose, Palo Alto, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/074,543

(22) Filed: May 8, 1998

(51) Int. Cl.[7] ................. G06F 3/00; G06F 3/16
(52) U.S. Cl. ............ 345/326; 345/348; 345/339; 345/978
(58) Field of Search .................. 345/348, 977, 345/978, 326, 302, 339

(56) References Cited

U.S. PATENT DOCUMENTS

| 5,374,924 | * | 12/1994 | McKiel, Jr. ............... | 345/340 |
| 5,767,835 | * | 6/1998 | Obbink et al. ............. | 345/146 |
| 5,801,692 | * | 9/1998 | Muzio et al. .............. | 345/339 |
| 5,867,144 | * | 2/1999 | Wyard ..................... | 345/146 |
| 5,945,986 | * | 8/1999 | Bargar et al. ............. | 345/302 |
| 5,969,719 | * | 10/1999 | Tsujimoto ................. | 345/349 |
| 6,081,266 | * | 6/2000 | Sciammarella ............. | 345/341 |

* cited by examiner

Primary Examiner—Raymond J. Bayerl
Assistant Examiner—Cuong T. Thai
(74) Attorney, Agent, or Firm—Burns, Doane, Swecker & Mathis, L.L.P.

(57) ABSTRACT

Systems and methods for providing an enhanced auditory behavior to a graphical user interface are described. Control elements portrayed by the graphical user interface on a display are associated with at least two states. When transitioning between states, a sound effect specified for that transition can be provided to provide further user or designer customization of the interface appearance. Movement of objects can be accompanied by a repeated sound effect. Characteristics of both sound effects can be easily adjusted in volume, pitch and frequency.

25 Claims, 8 Drawing Sheets

|   | TO | | | | | | | | |
|---|---|---|---|---|---|---|---|---|---|
|    | Q1 | Q2 | Q3 | Q4 | Q5 | Q6 | Q7 | Q8 | Q9 |
| Q1 |    | T1 | T3 | T5 |    |    | T7 |    |    |
| Q2 | T2 |    |    |    |    |    |    |    |    |
| Q3 | T4 |    |    |    |    |    |    |    |    |
| Q4 | T6 |    |    |    | T9 | T11 | T13 |    |    |
| Q5 |    |    |    | T10 |    |    |    |    |    |
| Q6 |    |    |    | T12 |    |    |    |    |    |
| Q7 | T8 |    |    | T14 |    |    |    | T15 | T17 |
| Q8 |    |    |    |    |    |    | T16 |    |    |
| Q9 |    |    |    |    |    |    | T18 |    |    |

FROM (row labels)

GRAPHICAL USER INTERFACE HAVING SOUND EFFECTS FOR OPERATING CONTROL ELEMENTS AND DRAGGING OBJECTS

RELATED APPLICATIONS

This application is related to U.S. patent application Ser. No. 08/243,327 entitled "A System and Method for Customizing Appearance and Behavior of Graphical User Interfaces" and to U.S. patent application Ser. No. 08/243,268 entitled "Switching Between Appearance/Behavior Themes in Graphical User Interfaces," and to U.S. patent application Ser. No. 08/242,963 entitled "Pattern and Color Abstraction in a Graphical User Interface," each of which was filed on May 16, 1994 and each of which is incorporated here by reference. This application is also related to U.S. patent application Ser. No. 08/435,387, entitled "Graphical User Interfaces Having Animated Control Elements", filed on May 5, 1995, the disclosure of which is incorporated here by reference.

COPYRIGHT NOTICE

A portion of the disclosure of this patent document contains material which is subject to copyright protection. The copyright owner has no objection to the facsimile reproduction of the patent disclosure as it appears in the Patent and Trademark Office patent file or records, but otherwise reserves all copyright rights whatsoever.

BACKGROUND

The present invention relates generally to graphical user interfaces for computer systems. More particularly, the present invention relates to systems and methods for interfacing applications and operating systems which provide for added behavior, in the form of sound effects, over object operation and movement in graphical user interfaces.

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly," "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

One type of GUI display is based on a visual metaphor which uses a monitor screen as a work surface called a "desktop" where documents are presented in relocatable regions termed "windows". The user interacts with the computer by, for example, moving objects on the desktop, choosing commands from menus, and manipulating window control elements, such as checkboxes and scroll bars. An exemplary desktop screen is reproduced as FIG. 1. Therein, various GUI objects including windows and icons are depicted.

Windows are one example of GUI objects which can be virtually any size, shape, or color. Some standard types of windows are commonly predefined for the interface including, for example, a document window and a dialog box. One example of a standard for a document window is illustrated in FIG. 2. Each document window which conforms to this standard has a title bar with a title drawn in a system-defined font and color. Active document windows can also have control elements as illustrated in FIG. 2, for example, a close box, a zoom box, a size box, and scroll bars. Other control elements, not shown in FIG. 2, include buttons, menu items and checkboxes. Those skilled in the art will recognize that myriad other control elements are known and in use.

Control elements are on-screen objects that a user can manipulate with, for example, a mouse to cause an immediate action or modify settings to cause a future action. For example, a button control element can provide for the graphical user interface to receive user input as to a selected function to be performed by the system. FIG. 3 illustrates a window entitled "Find" having three button control elements whose titles describe the function to be performed when these control elements are activated. A user can activate a button control element in a variety of ways, for example by positioning a cursor (not shown in FIG. 3) over the control element and providing an activating input, e.g., depressing a mouse button.

As shown in FIG. 3, control elements are typically displayed in a static default or normal state. However, when a button control element is actuated the graphical user interface redraws the control element in a second static state which visually informs the user that the system has recognized the user's input and is performing the desired function. For example, some conventional graphical user interfaces redraw button control elements in a depressed state to indicate activation. However, most software applications provide little or no corresponding sound behavior to accompany the transition between states.

The success of these types of conventional interfaces is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of applications. With these new resources at their disposal, application designers, and others, desire additional control over the appearance and behavior of the display, including the desktop environment and, in particular, objects and control elements on the desktop.

In the related application entitled "Graphical User Interfaces Having Animated Control Elements", it has been described how to provide additional control over the appearance of, for example, control elements by providing animated transition effects. The present invention expands upon these concepts by describing various techniques for creating realistic sound effects which can be provided to support object actions and enhance the behavior of the graphical user interface.

SUMMARY

According to exemplary embodiments of the present invention, improved behavioral characteristics can be provided to GUIs by providing sound effects associated with object operations. For example, one-shot sounds can be output when control elements are operated, e.g., a sound associated with actuating a button control element. The volume, pitch, delay and frequency of the sound effect can be varied either randomly or by the theme designer.

According to other exemplary embodiments of the present invention, a more complicated sound effect can be provided for GUI operations which involve dragging an object, e.g., an icon or a window, across the display. In these embodiments, a portion of the sound effect is repeated to provide for a variable length sound effect determined by the length of the drag operation. Panning can be incorporated by mixing stereo channels to provide an auditory effect of movement.

BRIEF DESCRIPTION OF THE DRAWINGS

The foregoing, and other, objects, features and advantages of the present invention will be more readily understood by those skilled in the art upon reading the following detailed description in conjunction with the drawings in which.

DETAILED DESCRIPTION

The present invention is described herein by way of exemplary, illustrative embodiments, some of which use the Macintosh® computer system and visual displays created thereby as a reference for explaining the present invention. Those desiring additional information with respect to the Macintosh® system are referred to *Inside Macintosh*, Vols. 1–6. Of course, those skilled in the art will readily appreciate that systems and methods according to the present invention can be applied to any type of display system having a user interface. Further, although certain operations associated with exemplary GUI objects used in an operating system (as opposed to applications running under the control of the operating system) are used to describe concepts according to the present invention, it will be understood that the sound effects described by the present invention are applicable to any type of manipulation of any type of interface object.

Figure 1:
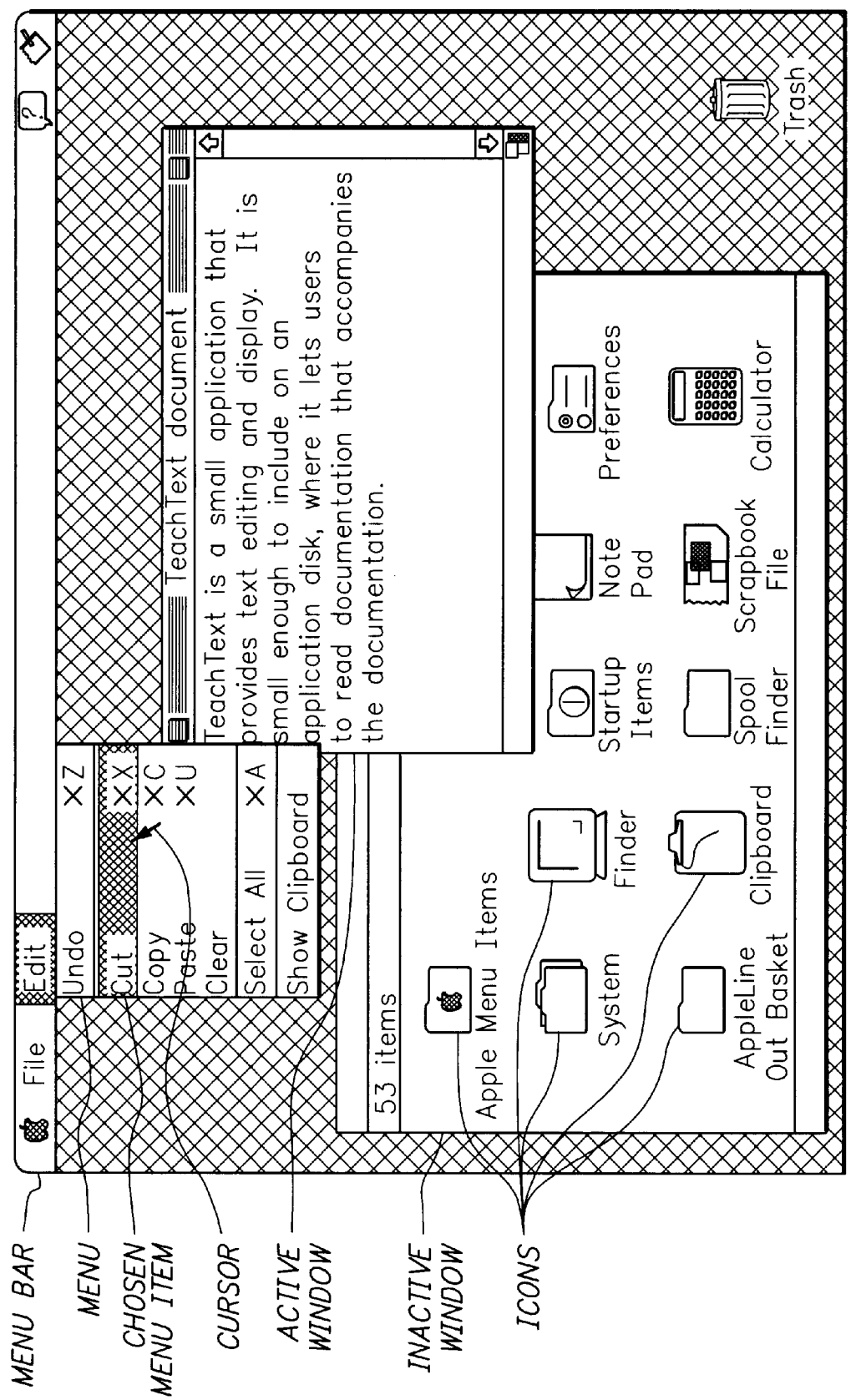
FIG. 1 shows a conventional desktop screen.
Figure 2:
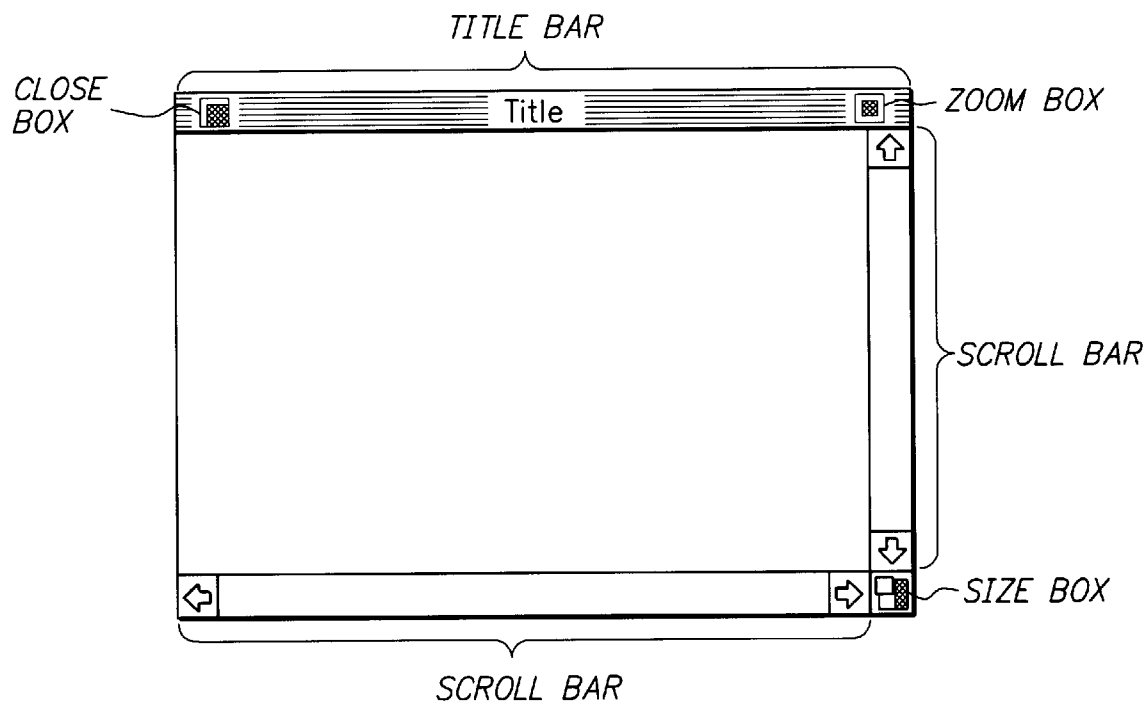
FIG. 2 shows a conventional document window.
Figure 3:
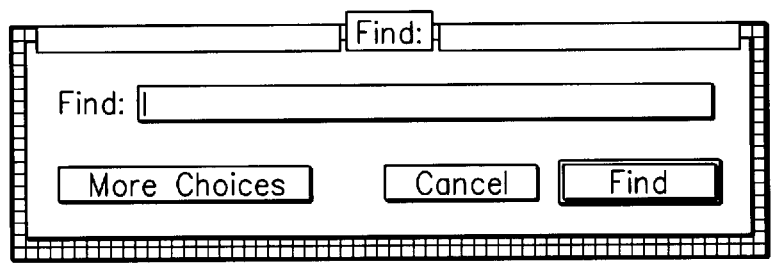
FIG. 3 illustrates an exemplary window having button control elements.
Figure 4A:
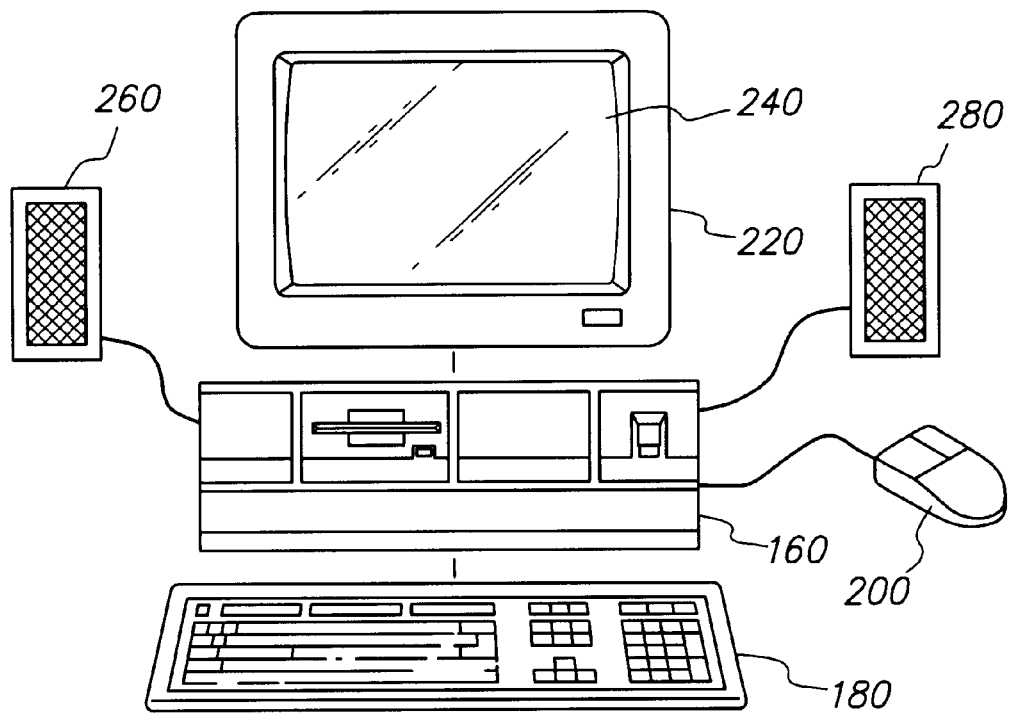
FIG. 4A illustrates an exemplary computer system which can be used in conjunction with the present invention.

Graphical user interfaces according to the present invention can, for example, be used in conjunction with a computer such as that illustrated in FIG. 4A and in particular with operating systems used to coordinate the operation of such computers. Therein, a personal computer is illustrated as having a box 16 which contains, among other elements, circuit boards associated with the computer's functions including memory devices and one or more processors, a keyboard 18, a pointing device 20 and a monitor 22 having a display space 24. The computer will also preferably include at least two speakers 26 and 28 associated with at least two audio channels driven by an audio processing component (not shown) in box 16. More than two speakers and two audio channels, e.g., four, may also provided and those skilled in the art will readily appreciate that the sound effect concepts described below are readily extensible to more than two audio channels. Moreover, the speakers may alternatively be built into the box 16.

Figure 4B:
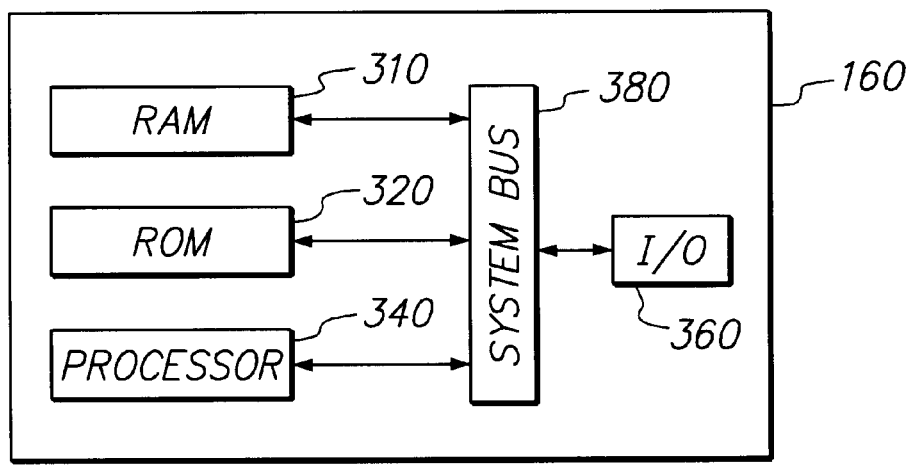
FIG. 4B is a block diagram illustrating various exemplary functional units of the computer system of FIG. 4B.

Of course the personal computer illustrated in FIG. 4A is purely exemplary of one type of computer system in which graphical user interfaces according to the present invention may be implemented. For example, although the display space 24 of the system depicted in FIG. 4A consists of that provided by monitor 22, those skilled in the art will recognize that additional display devices could be arranged proximate monitor 22 to create a display space bridging several monitors. The circuit boards included in box 16 can include boards which accommodate functional units such as those illustrated by the block diagram of FIG. 4B. Therein RAM 300, ROM 320, processor 340, and I/O 360 (including sound/audio processing functionality) are all interconnected via system bus 380.

The computer system can also have known I/O devices (e.g., CD drives, floppy disk drives, hard drives, etc.) which can store and read programs and data structures used to implement the below-described techniques. These programs and data structures can be encoded on such computer-readable media. For example, the theme data files including sound effect information described below can be stored on computer-readable media and read whenever a theme is selected for GUI operation.

According to exemplary embodiments of the present invention, sound effects associated with the operation of GUI objects can be provided. These sound effects can be specified for each theme, e.g., as part of the data structure found in a theme data file, in a manner that is consistent with the appearance characteristics of that theme, e.g., the object geometries and fill patterns. A discussion of themes and methods for handling themes is unnecessary for understanding the present invention, other than a general recognition that a theme represents a predetermined definition of appearance and behavior attributes associated with GUI objects and that multiple themes having different definitions can be provided to a system wherein the underlying functions of the GUI objects remains the same. However, the interested reader is referred to the above-identified applications or to U.S. patent application Ser. No. 09/074,519, entitled "A Multiple Theme Engine Graphical User Interface Architecture", filed on the same date as this application, the disclosure of which is incorporated here by reference.

Sound effects according to the present invention can be categorized as either one-shot sounds or looped sounds.

One-shot sound effects can be associated with state changes in objects. State changes occur when an object is operated on, either by a user or by an application, to change its state, e.g., checking a checkbox, depressing a button, opening and closing menus, opening and closing windows, emptying a trash container, mounting a volume, etc. State tables can be used to store information identifying the transitional sound effects between states that are associated with particular operations on an object. An exemplary state diagram table is shown as FIG. 5 which provides an example of possible states and common state transitions for a checkbox control element of a window. This state diagram can then be reduced to a state table as shown in FIG. 6.

Figure 5:
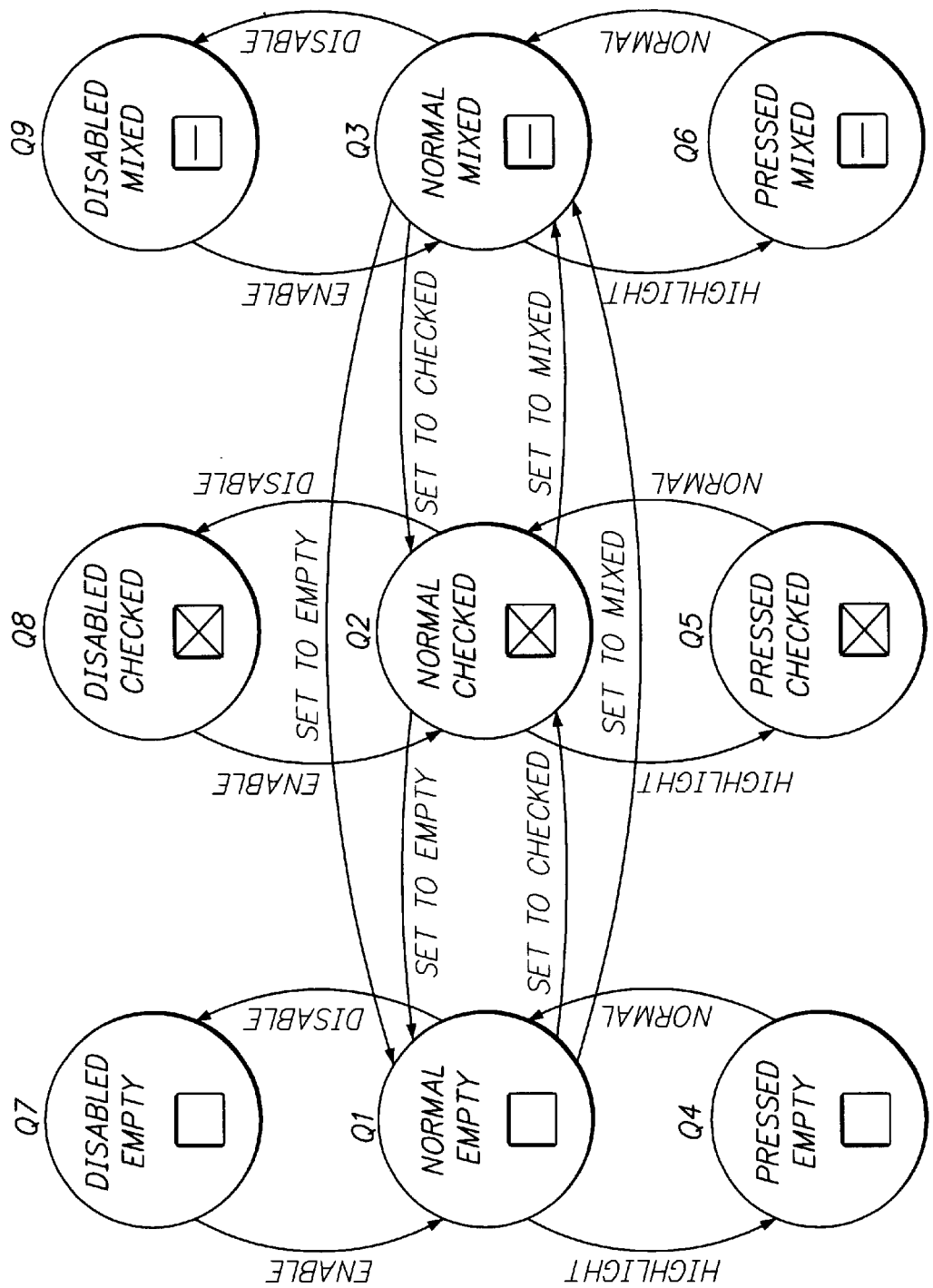
FIG. 5 is a state diagram used to illustrate sound effect transitions of a control element according to an exemplary embodiment of the present invention.
Figures 6, 7:
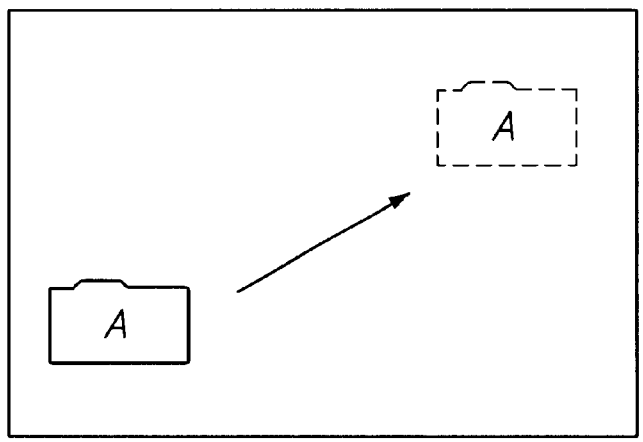
FIG. 6 is an exemplary state matrix used to describe control element transitional sound effects according to an exemplary embodiment of the present invention.
FIG. 7 illustrates a drag operation wherein a looping sound effect can be output.

As seen in FIGS. 5 and 6, this exemplary checkbox control element has nine possible states Q1–Q9 which can be displayed on the GUI. These states include three highlighted display states for each of the control element's three values. For example, when a user clicks on an unchecked checkbox (state Q1) using a mouse button, this action moves the control to its pressed state (state Q4). After the mouse button is released, the control returns back to its original state (state Q1) and the application is notified of the button which has been pressed. The application then switches the value of the control to its new value, which might be checked (state Q2).

FIG. 6 is a matrix of all of the possible transitions between states Q1 and Q9. Transition sound effects are indicated for some of these transitions by the notations T1–T18 found in some of the matrix locations. For example, transition effect T1 occurs when an empty checkbox (state Q1) becomes checked (state Q2). This effect could be, for example, a one-shot clicking noise that has been predefined by the theme file for this particular transition output through speakers 26 and 28. Other themes may use other sound effects, or no sound effect, for the same transition T1. Note that not all of the state transitions are required to have transition effects as underscored by the empty matrix locations in FIG. 6.

In addition to specifying a particular one-shot sound to be output as a sound effect for a particular transition, the present invention also provides the theme designer with techniques for re-using or adjusting the recorded sound. For example, the data structure which defines the sound effect for a particular state transition may include variables associated with the gain (volume), delay (period beginning when a state change occurs and ending when the output of the sound effect begins) and pitch to be used when outputting the identified sound for a particular object transition. Thus, the same recorded sound effect could be re-used for different state transitions by varying one or more of these output parameters. This technique also permits the theme designer to make small adjustments in a recorded sound effect without actually re-recording the effect.

One-shot sound effects associated with state changes are played asynchronously until complete, e.g., depressing a button may result in a one-shot sound effect that ends when the button is displayed in its fully sunk position. By way of contrast, movement of objects across the desktop can be accompanied by a looping sound effect designed to promote auditory perception of movement. These sound effects are "looping" in the sense that certain sound segments are repeated to accommodate the variable length nature of these effects.

Looping sound effects according to the present invention will be described herein by way of examples which involve dragging objects across the GUI, e.g., dragging a scroll bar indicator, a slider, a window or an icon, although those skilled in the art will appreciate that looping sound effects can be used for other object operations, e.g., resizing of objects. Consider the exemplary folder in FIG. 7 being dragged from the position indicated by the solid outline of the folder to the position indicated by the dotted outline. When a user initiates the drag operation, e.g., by holding down a mouse button while the cursor is positioned over the folder and beginning to move the mouse, the drag sound (for the currently selected theme) will begin and will continue until the drag operation is completed. Thus, unlike the one-shot sound effects associated with state changes which each have a fixed duration, drag sound effects have a variable duration dependent upon the length of the object movement period. This is accomplished by repeating, or looping, certain sound segments associated with this sound effect.

Exemplary embodiments of the present invention divide drag sounds into three segments: an attack segment, a sustain segment and a decay segment. Each of these segments can be recorded separately and identified individually in the loaded theme data file or in the code which runs the theme. The attack segment is played first to initiate the drag operation, e.g., when the user begins to move folder A. Then, the sustain segment is repeated while the drag operation continues, e.g,. while the folder is moving across the screen from its original position to its new position. Once the drag operation terminates, the decay segment is played to gradually transition out the sound effect associated with this drag operation, e.g, when the user releases the mouse button after the folder A is in the position indicated by the dotted outline in FIG. 7. As with the one-shot sound effects, the looping sound effects can also be adjusted by gain, delay and pitch variables which can be individually established for each effect.

Figure 6A:
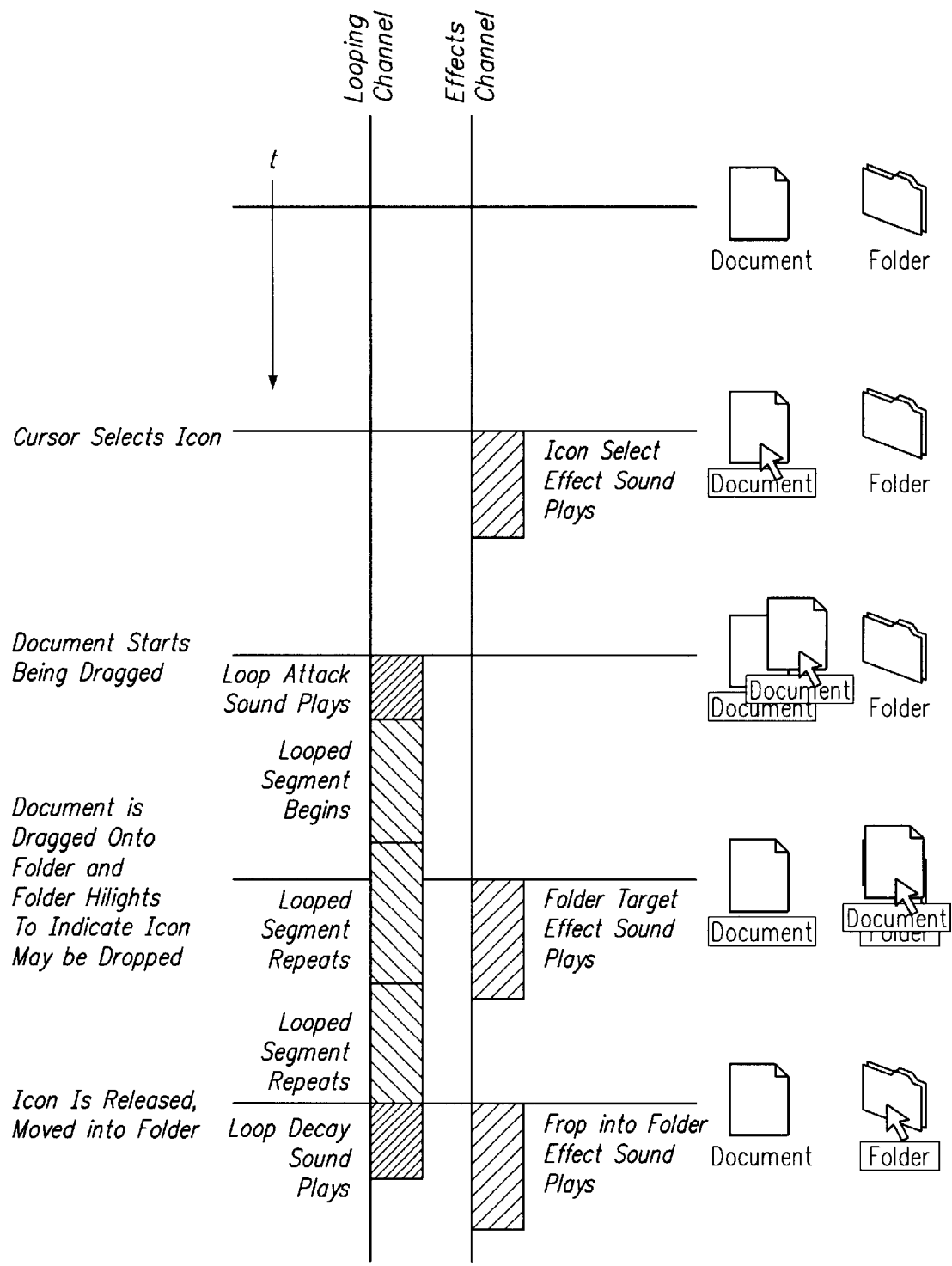
FIG. 6A depicts a sequence of sound effect reproduction involving an exemplary one-shot sound effect and looping sound effect.

Although described separately here, those skilled in the art will appreciate that one-shot sounds can be reproduced while a looping sound effect is being played. For example, if a document icon is dragged across the screen, a corresponding looping sound effect will be played. If the document icon is dropped onto a container, such as a folder or a trash can, the state change associated with the placement of the document into the container may trigger a one-shot sound which may play at the same time as, for example, the decay segment of the looping sound effect associated with the drag operation. These, and other, exemplary coordinations between one-shot and looping sound effects are illustrated in FIG. 6A.

To further enhance the user's perception of the position of an object on the screen or that the object is moving, the one-shot sound effects can be output with a volume variation between speakers 26 and 28, and the looping sound effect can be actively panned between speakers 26 and 28. This is accomplished by stereo mixing of the sound effect between the speakers based on the object's position on the screen to achieve an auditory effect which implies location or movement. For the one-shot sound effect, this simply involves playing the sound effect at a fixed, but different volume from each speaker (unless the object that is changing states is in the middle of the screen). For looping sound effects, active panning changes the volume of the sound effect in each channel based on the cursor position. In the example of FIG. 7, the sound effect would begin, i.e., with the attack segment, being more loudly output from speaker 26 than speaker 28 (FIG. 4A). As the folder is dragged across the screen the loudness ratio between speaker 26 and speaker 28 would gradually shift to being roughly equal near the middle of the screen and, ultimately, to being output more loudly from speaker 28 as the folder neared the position indicated by the dotted outline.

Figure 8:
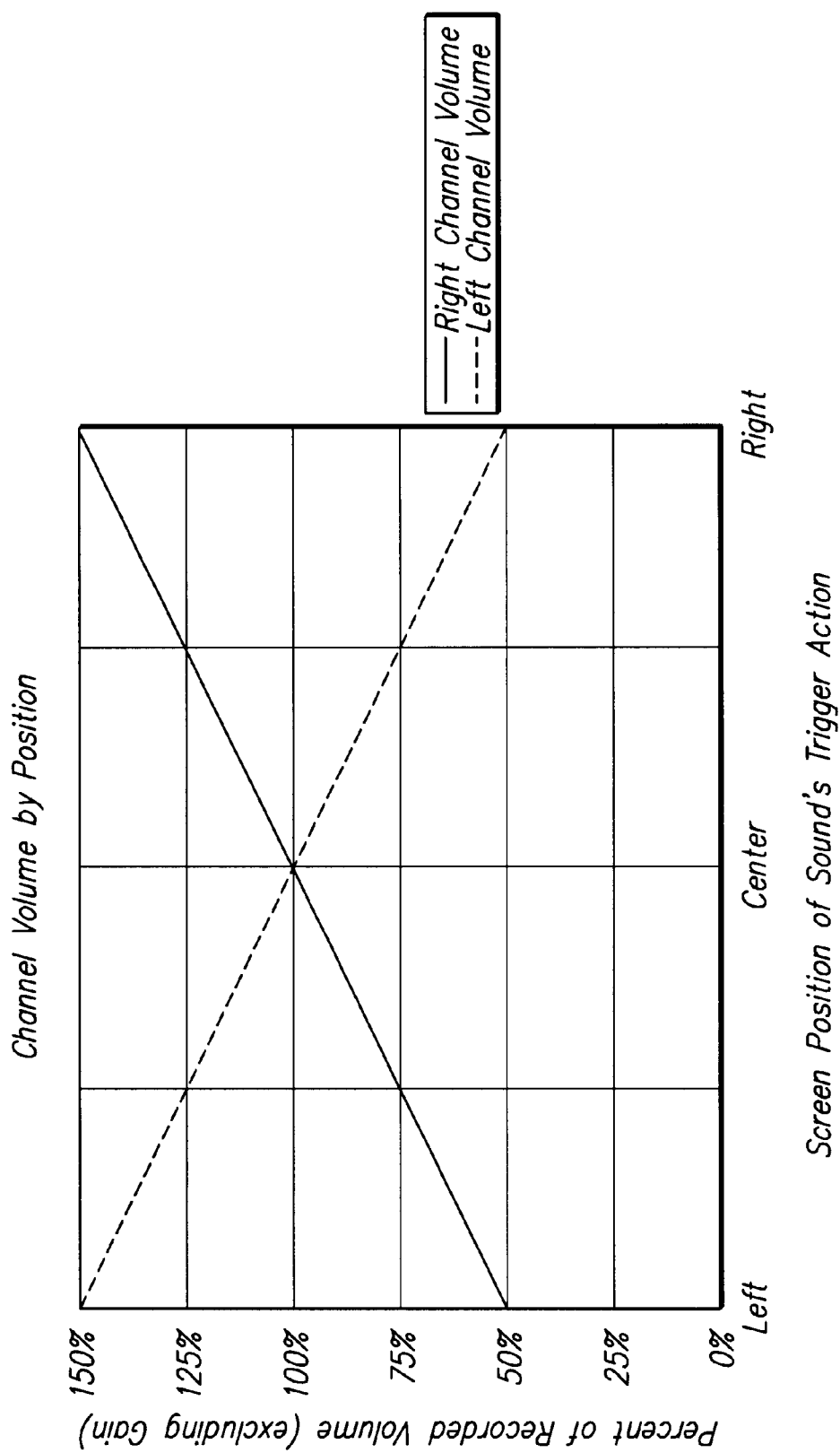
FIG. 8 is a graph illustrating a panning function used to vary sound effect volume between speakers according to an exemplary embodiment of the present invention.

Applicants have discovered that the realism of the panning effect can be optimized by mixing the sound effect between the two channels as illustrated in FIG. 8. Therein, the panning relationship is plotted as a function of sound effect volume (without taking into account any modifications made to the volume by virtue of the gain parameter specified in the data structure for this sound effect) versus screen position of the dragged object. It will be seen that the volume will vary between a minimum of about 50% of its recorded value to a maximum of about 150% of its recorded value (excluding gain variations). If a gain value is specified for the sound effect for a particular theme, then the gain value is multiplied by the illustrated percentage of recorded volume, for each channel, to determine an appropriate output volume for the object at its current position. As mentioned above, this aspect of the present invention can readily be extended to provide for active panning in more than two directions, e.g. four, by providing four speakers and audio channels.

According to other exemplary embodiments of the present invention, frequency variation can be introduced to provide some auditory variety in both the one-shot and looping sound effects. For example, each time that a sound effect is called in response to a state change or object movement, the corresponding sound effect can be played at a frequency that is pseudo-randomly selected. The frequency for playback can be selected from within a frequency envelope centered at the originally recorded frequency and having, for example, a width of plus or minus about 2.5 percent. By changing the frequency slightly from repetition to repetition, exemplary embodiments of the present invention avoid user fatigue with respect to the sound effects and promote enablement of this functionality.

Figure 9:
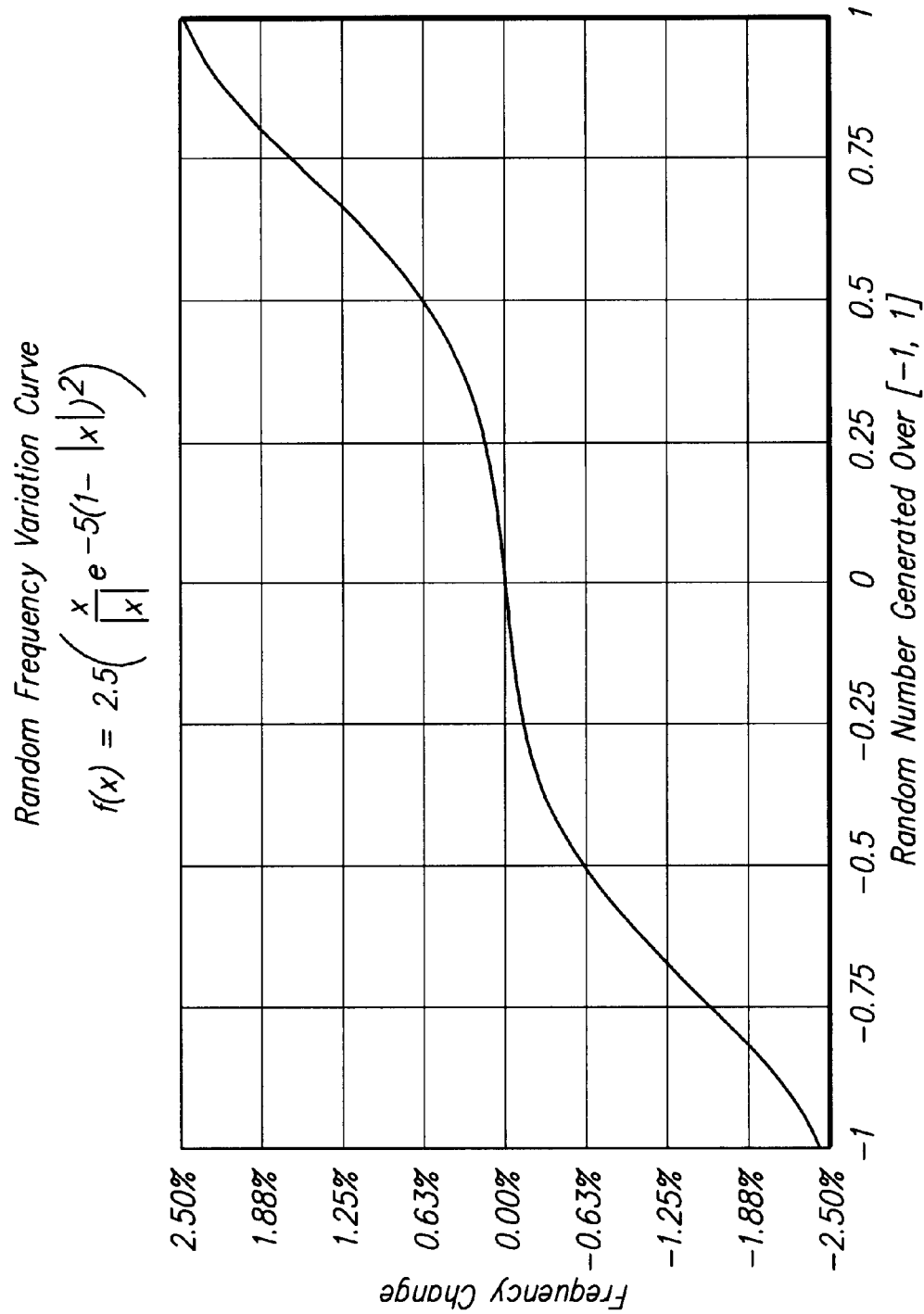
FIG. 9 is a graph illustrating random frequency variation determination for sound effects according to exemplary embodiments of the present invention.

At the same time, however, a certain amount of consistency in the frequency of each sound effect is desirable to preserve the auditory effect intended by the theme designer and to allow the user to easily associate the sound effect with the corresponding state change or object movement. Thus, according to one exemplary embodiment of the present invention, selection of a frequency from within the envelope is weighted such that frequencies closer to the originally recorded frequency are more likely to be selected than frequencies toward the edges of the envelope. For example, a suitable weighting function is illustrated in FIG. 9. Therein, a random number is generated within an interval between plus and minus one and each value has a corresponding frequency variation associated therewith. It can be seen in the Figure that the curve is weighted such that fully half of the randomly selected frequency variations are within one quarter of the total envelope in this exemplary weighting.

Various controls can be put into place to provide for an orderly presentation of sound effects. For example, sound effect commands may be temporarily overridden to avoid an avalanche of effects, e.g., when closing or opening many windows at the same time. Similarly, drag sound effects can be limited to one at a time to provide for a consistent auditory experience.

Sound effects can be classified in one of a plurality of effect levels. In this way, a sound control panel can be provided in the GUI which allows a user to select from more sound to less sound at which she or he would prefer to operate the interface at any given time. Alternatively, or in addition thereto, sounds may also be enabled or disabled by a user by functional category. For example, sound effects may be enabled or disabled for all windows, all menus, all icons of a certain type, etc.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for providing a sound effect between a first display position associated with an object drawn on a graphical user interface of a computer system and a second display position associated with said object, the method comprising the steps of:
   drawing said object in said first display position of a display space controlled by said graphical user interface;
   receiving, at said graphical user interface, a user input invoking movement of said object;
   retrieving a sustain sound segment; and
   repeatedly reproducing said sustain sound segment until said graphical user interface receives a second user input indicating that said object has reached said second display position.

2. The method of claim 1, further comprising the step of:
   panning said reproduced sustain sound segment between speakers as said object moves from said first display position to said second display position.

3. The method of claim 2, wherein said step of panning further comprises the steps of:
   varying a volume between said speakers between 50 and 150 percent of a recorded volume depending upon a current display position.

4. The method of claim 1, wherein said step of reproducing further comprises the step of:
   reproducing said sustain sound segment at a volume specified for movement of said object.

5. The method of claim 1, wherein said step of reproducing further comprises the step of:
   reproducing said sustain sound segment at a pitch specified for movement of said object.

6. The method of claim 1, wherein said step of reproducing further comprises the step of:
   reproducing said sustain sound segment after a delay specified for movement of said object.

7. The method of claim 1, further comprising the step of:
   retrieving, prior to retrieving said sustain sound segment, an attack sound segment that is reproduced prior to repeatedly reproducing said sustain sound segment.

8. The method of claim 1, further comprising the step of:
   retrieving and reproducing, after said second user input is received, a decay sound segment.

9. The method of claim 1, further comprising the step of:
   selecting, from within a range of frequencies, a frequency for repeatedly reproducing said sustain sound segment.

10. The method of claim 9, wherein said step of selecting further comprises the step of:
    setting said range of frequencies to an envelope of about plus/minus 2.5 percent of an original frequency at which said sustain sound segment was recorded.

11. The method of claim 10, wherein said step of selecting further comprises the step of weighting selection of said frequency from within said envelope.

12. The method of claim 1, wherein the sustain sound segment is retrieved in response to said user input invoking movement of said object.

13. In a computer having a display, a system for providing a sound effect between a first and a second display position of an object on said display, said system comprising:

an input device for controlling movement of a cursor on said display and for generating a user-controlled output when said cursor is positioned over a control element;

a graphical user interface for rendering said object on said display in said first display position and for receiving said user-controlled output; and a storage device for storing said sound effect associated with movement of said object, wherein when said graphical user interface receives said user-controlled output, said graphical user interface outputs said sound effect until said object reaches said second display position.

14. The system of claim 13, further comprising:

at least two speakers for outputting said sound effect; and means for panning said sound effect between speakers as said object moves from said first display position to said second display position.

15. The system of claim 14, wherein said means for panning further comprises:

means for varying a volume between said speakers between 50 and 150 percent of a recorded volume depending upon a current display position.

16. The system of claim 13, wherein a data structure associated with said sound effect includes a volume parameter specified for output of said sound effect.

17. The system of claim 13, wherein a data structure associated with said sound effect includes a pitch parameter specified for output of said sound effect.

18. The system of claim 13, wherein a data structure associated with said sound effect includes a volume gain parameter specified for output of said sound effect.

19. The system of claim 13, wherein a data structure associated with said sound effect includes an attack segment, a sustain segment and a decay segment.

20. The system of claim 19, further comprising:

means for retrieving, prior to retrieving said sustain sound segment, said attack sound segment that is reproduced prior to repeatedly reproducing said sustain sound segment.

21. The system of claim 20, wherein said means for retrieving further comprises:

means for retrieving and reproducing, after said second display position is reached, said decay sound segment.

22. The system of claim 13, further comprising:

means for selecting, from within a range of frequencies, a frequency for repeatedly reproducing said sound effect.

23. The system of claim 22, wherein said means for selecting further comprises:

means for setting said range of frequencies to an envelope of about plus/minus 2.5 percent of an original frequency at which said sound effect was recorded.

24. The system of claim 23, wherein said means for selecting further comprises:

means for weighting selection of said frequency from within said envelope.

25. The system of claim 13, further comprising:

means for initiating said sound effect outputted by said graphical user interface in response to the movement of said object.

* * * * *

UNITED STATES PATENT AND TRADEMARK OFFICE
CERTIFICATE OF CORRECTION

PATENT NO. : 6,297,818 B1
DATED : October 2, 2001
INVENTOR(S) : Robert Ulrich et al.

Page 1 of 1

It is certified that error appears in the above-identified patent and that said Letters Patent is hereby corrected as shown below:

<u>Claim 3,</u>
Line 31, delete "steps", insert -- step --.

Signed and Sealed this

Ninth Day of April, 2002

Attest:

Attesting Officer

JAMES E. ROGAN
Director of the United States Patent and Trademark Office